(12) United States Patent
Gambhir et al.

(10) Patent No.: US 12,314,306 B2
(45) Date of Patent: May 27, 2025

(54) SYSTEMS AND METHODS OF GENERATING NEW CONTENT FOR A PRESENTATION BEING PREPARED IN A PRESENTATION APPLICATION

(71) Applicant: Microsoft Technology Licensing, LLC, Redmond, WA (US)

(72) Inventors: Prerana Dharmesh Gambhir, San Jose, CA (US); Oishika Chaudhury, San Jose, CA (US); Vedant Dulori, Sunnyvale, CA (US); Aniruddha Dinesh Mallya, San Jose, CA (US)

(73) Assignee: Microsoft Technology Licensing, LLC

( * ) Notice: Subject to any disclaimer, the term of this patent is extended or adjusted under 35 U.S.C. 154(b) by 77 days.

(21) Appl. No.: 18/315,788

(22) Filed: May 11, 2023

(65) Prior Publication Data
US 2024/0378232 A1  Nov. 14, 2024

(51) Int. Cl.
*G06F 3/048* (2013.01)
*G06F 16/438* (2019.01)
*G06T 11/60* (2006.01)

(52) U.S. Cl.
CPC .......... *G06F 16/4393* (2019.01); *G06T 11/60* (2013.01)

(58) Field of Classification Search
CPC .............................. G06F 16/4393; G06T 11/60
See application file for complete search history.

(56) References Cited

U.S. PATENT DOCUMENTS

| | | | |
|---|---|---|---|
| 10,956,635 B1 | 3/2021 | Douglas | |
| 11,210,836 B2 * | 12/2021 | Amer | G06T 7/251 |
| 11,238,197 B1 * | 2/2022 | Douglas | G16H 20/40 |
| 2019/0304104 A1 * | 10/2019 | Amer | G06T 13/80 |
| 2019/0317739 A1 * | 10/2019 | Turek | G06N 3/045 |
| 2022/0198779 A1 * | 6/2022 | Saraee | G06F 16/9536 |
| 2022/0383615 A1 * | 12/2022 | Saraee | G06Q 50/01 |

(Continued)

OTHER PUBLICATIONS

International Search Report and Written Opinion received for PCT Application No. PCT/US2024/026700, Aug. 7, 2024, 17 pages.

(Continued)

*Primary Examiner* — David Phantana-angkool
(74) *Attorney, Agent, or Firm* — NovoTechIP International PLLC

(57) ABSTRACT

A data processing system includes: a server having a processor and a network interface; and a memory comprising programming instructions including a prompt generation engine. When executed by the processor, alone or in combination with other processors, the instructions cause the server to implement a service to: receive multiple media files from a presentation application on a client device; restructure content of the media files into a form compatible with a generative Artificial Intelligence (AI) tool; with the prompt generation engine, structure a prompt to the generative AI tool using the content of the media files in the form compatible with the generative AI tool, the prompt comprising an instruction to generate new content by fusing content from the multiple media files; receive the new content from the generative AI tool; and transmit the new content to the presentation application on the client device to augment a presentation being generated with the presentation application.

20 Claims, 9 Drawing Sheets

(56) References Cited

U.S. PATENT DOCUMENTS

| | | | | |
|---|---|---|---|---|
| 2023/0134690 A1* | 5/2023 | Chen | ................ | G06N 3/045 |
| | | | | 345/419 |
| 2024/0202240 A1* | 6/2024 | Nir | ................ | G06F 16/784 |
| 2024/0242408 A1* | 7/2024 | Gudkov | ................ | G06V 10/761 |
| 2024/0267611 A1* | 8/2024 | Speasl | ................ | H04N 23/62 |
| 2024/0282079 A1* | 8/2024 | Saraee | ................ | G06V 10/82 |
| 2024/0297957 A1* | 9/2024 | Bakunov | ................ | G06V 10/945 |
| 2024/0330381 A1* | 10/2024 | Sadr | ................ | G06F 16/9535 |
| 2024/0378763 A1* | 11/2024 | Assouline | ................ | G06N 3/08 |

OTHER PUBLICATIONS

Mao, et al., "Multi-focus images fusion via residual generative adversarial network," Multimedia Tools and Applications, vol. 81, Issue No. 9, Aug. 20, 2021, 19 pages.

\* cited by examiner

SYSTEMS AND METHODS OF GENERATING NEW CONTENT FOR A PRESENTATION BEING PREPARED IN A PRESENTATION APPLICATION

BACKGROUND

Presentation software applications are a powerful tool for creating visuals to be used in support of a presentation or to convey information. Typically, presentation applications allow the user to prepare a series of slides that are displayed or presented during a presentation. Each slide can include a variety of media or content elements, such as text, images, audio files and video files. A presentation application allows the user to add and arrange these elements to configure each slide as desired.

Sometimes, however, the user may not have or be able to find exactly the content that they would like to include in the presentation. This presents a technical problem in that the user must then find or create content that better meets the needs of the presentation. Depending on what content is needed and what the user has to work with, this may be frustratingly time-consuming or simply beyond the abilities of the user.

SUMMARY

In one general aspect, the instant disclosure explains a data processing system that includes: a server having a processor, a network interface and a memory comprising programming instructions including a prompt generation engine. When executed by the processor, alone or in combination with other processors, the instructions cause the server to implement a service to: receive multiple media files from a presentation application on a client device or from the web; restructure content of the media files into a form compatible with a generative Artificial Intelligence (AI) tool; with the prompt generation engine, structure a prompt to the generative AI tool using the content of the media files in the form compatible with the generative AI tool, the prompt comprising an instruction to generate new content by fusing content from the multiple media files; receive the new content from the generative AI tool; and transmit the new content to the presentation application on the client device to augment a presentation being generated with the presentation application. The multiple media files fused may be different types of media files.

In another general aspect, the instant disclosure explains a presentation application for execution by a client device comprising a processor and memory, the presentation application to be stored in non-transitory memory of the client device and comprising executable instructions that, when executed by the processor causes the processor alone or in combination with other processors to: present a user interface for generating a presentation, the user interface configured to receive multiple media files each comprising content to be included in the presentation; and, in response to user instructions, call a service to restructure content of the media files into a form compatible with a generative Artificial Intelligence (AI) tool; structure a prompt to the generative AI tool using the content of the media files in the form compatible with the generative AI tool, the prompt comprising an instruction to generate new content by fusing content from the multiple media files; and transmit the new content to the presentation application on the client device. The application configured to display the new content in the user interface with controls for using the new content to augment the presentation being generated with the presentation application.

In another general aspect, the instant disclosure describes a method of providing a service to generate new content by combining two input sets of content, the service supported by a server having a processor, a network interface and a memory comprising programming instructions including a prompt generation engine which, when executed by the processor alone or in combination with other processors, causes the server to implement the method. The method includes: receiving multiple media files from a presentation application on a client device; restructuring content of the media files into a form compatible with a generative Artificial Intelligence (AI) tool; with the prompt generation engine, structuring a prompt to the generative AI tool using the content of the media files in the form compatible with the generative AI tool, the prompt comprising an instruction to generate new content by fusing content from the multiple media files; receiving the new content from the generative AI tool; and transmitting the new content to the presentation application on the client device to augment a presentation being generated with the presentation application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As noted above, presentation software applications allow a user to prepare a series of slides for use during a presentation, where each slide can include a variety of media or content elements. Sometimes, however, the user may not have exactly the content that they would like to include in the presentation. This presents a technical problem in that the user must then find or create content that better meets the needs of the presentation. Depending on what content is needed and what the user has to work with, this may be frustrating, time-consuming or simply beyond the abilities of the user.

Figure 1:
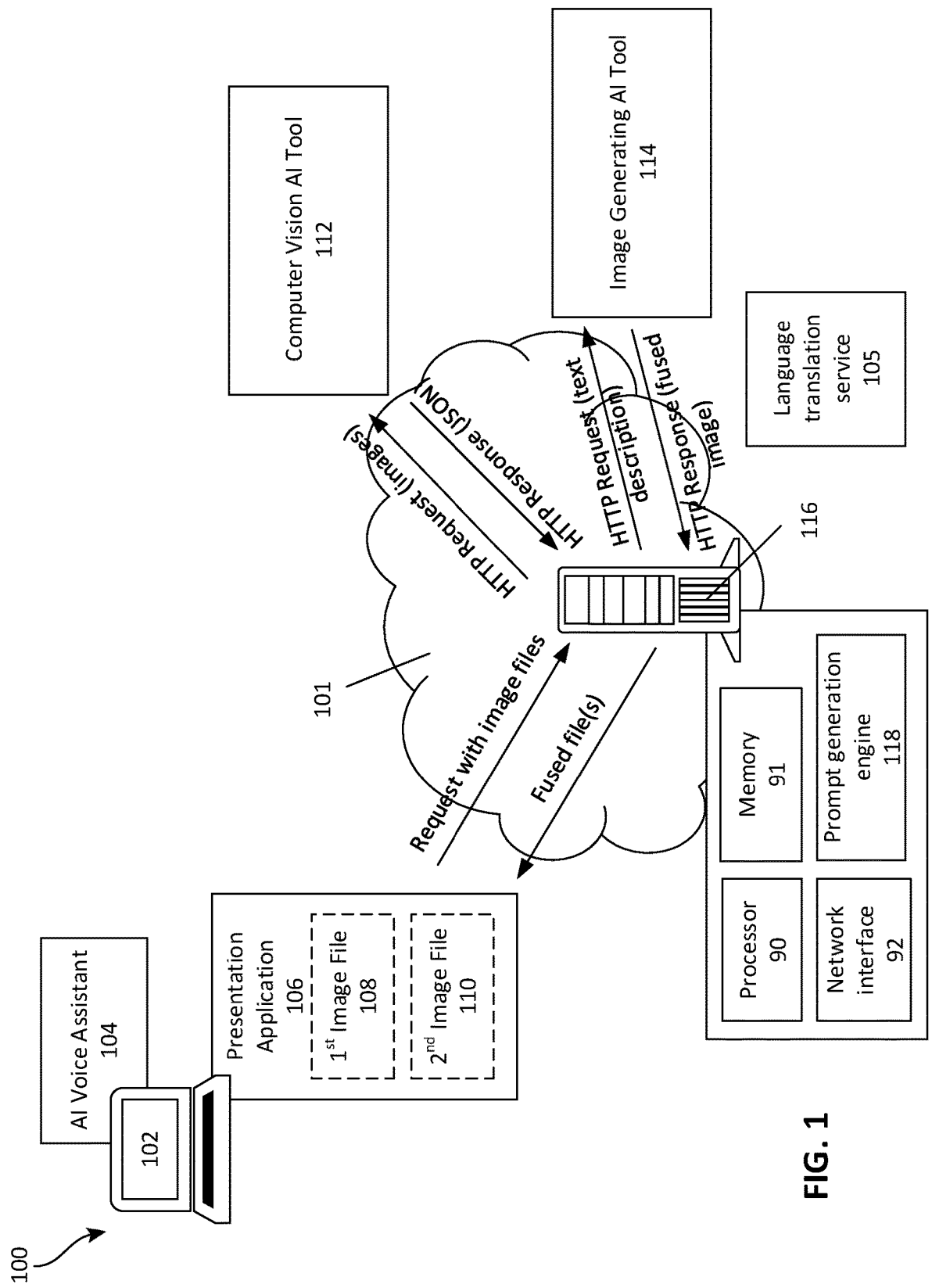
FIG. 1 depicts an example system upon which aspects of this disclosure may be implemented to generate new image content.

To provide a technical solution to this technical problem, FIG. 1 depicts an example system 100 upon which aspects of this disclosure may be implemented. As shown in FIG. 1, a presentation application 106 is executing on a computer 102. This computer 102 can be any computerized device, including, but not limited to, a desktop, laptop, server, tablet computer or even a smart phone. This presentation application 106 can be a dedicated application, in some examples, or may be a browser communicating with a server that provides a presentation application as a service. An example of a presentation application is PowerPoint® by Microsoft®. As noted above, the presentation application allows the user to prepare a series of slides that are displayed or presented during a presentation. Each slide can include a variety of media or content elements, such as text, images, audio files and video files. The presentation application 106 allows the user to add and arrange these elements to configure each slide as desired.

FIG. 1 depicts a specific example in which the user of a presentation application 106 would like an image for use in a presentation that does not yet exist or the like of which the user doesn't have. The user has two different images and has loaded the corresponding image files 108 and 110 into the presentation application 106. However, in this scenario, each of the two different images includes elements that the user would prefer to have combined in one single image. For example, the first image file 108 provides an image of a person, and the second image file 110 provides an image of a flower. The user actually wants a single image of a person holding a flower. In particular, the user may want a single image of a person resembling the person in the first image file 108 holding a flower of the type in the second image file 110.

To obtain the desired content and solve this technical problem, the presentation application 106 can access a service. In the example of FIG. 1, this service is supported by a server 116 that is in communication with the computer 102 via a network 101, for example, the internet. As shown in FIG. 1, the presentation application 106 sends a request that includes the image files to the server 116. This request will include a prompt entered by the user that a new image is to be generated of a person holding a flower using the two image files 108 and 110 as inputs.

To generate the image that the user desires, the server 116 can utilize an image generating Artificial Intelligence (AI) tool. AI has made significant advancements in the field of image generation in recent years. Specifically, text-to-image refers to a process of generating images from text descriptions using machine learning algorithms and deep neural networks. The aim is to train an AI model to interpret natural language descriptions and create an image that accurately represents the description. Text to image technology is based on the use of Generative Adversarial Networks (GANs), a type of neural network that consists of two main components: a generator and a discriminator. The generator creates new images based on a given text input, while the discriminator evaluates the realism of the generated images and provides feedback to the generator. This process is repeated iteratively until the generator produces realistic images that match the text description. Current examples of image generating tools include DALL-E by Open AI and Stable Diffusion by Stability AI.

The server 116 includes a prompt generation engine 118. This prompt generation engine 118 is software configured to structure the input instructions or prompt for an image generating AI tool 114. Current image generating AI tools 114 are trained to operate on text and, consequently, do not readily accept image data as an input. Current image generating AI tools 114 also operate more efficiently on prompts in the English language. Consequently, the prompt generation engine 118 may have several tasks. If the instructions from the user of the presentation application 106 are in a human language other than English, the prompt generation engine 118 can call a language translation service 105 over the network 101 to translate the user's instruction to English. The prompt generation engine 118 will also convert the image files 108 and 110 into a form that is more compatible for input to the image generating AI tool 114.

For this, the prompt generation engine 118 may transmit a request that includes the image files to a computer vision AI tool 112 via the network 101. As shown in FIG. 1, this may be a HyperText Transfer Protocol (HTTP) request. Computer vision is a field of AI that focuses on enabling machines to interpret and understand visual data from the world around us, including images and videos. The computer vision AI tool 112 will convert the image data of the image files 108, 110 into a more-textual format, such as JSON (JavaScript Object Notation), that is ingestible by the image generating AI tool 114. JSON is a lightweight data interchange format that is commonly used to transmit data between a server and a web application. JSON is not an image format, but rather a way to represent structured data such as an image, using text or numerical values. Thus, an application programming interface (API) of the computer vision AI tool 112 can return the results of image analysis in JSON format. For example, these APIs can analyze an image and return a JSON response that includes information about the objects and features detected in the image, such as the location of faces, the presence of text, or the identification of specific objects or landmarks. Examples of such APIs include Microsoft's Computer Vision API and Google's Cloud Vision API. The prompt generation engine 118 receives the JSON data for the image files 108 and 110 via an HTTP response.

The prompt generation engine 118 then structures a prompt for the image generating AI tool 114. This prompt or request structured by the prompt generation engine 118 includes the JSON data or other data in another AI tool compatible format along with the textual description or instructions provided by the user of the application 106 as to how the images are to be fused or combined. In the present example, this instruction is for an image of a person holding a flower. Consequently, all the data of the prompt from the engine 118 is in a form readily ingestible by the image generating AI tool 114.

There are a number of data formats which current AI tools or models can find compatible and readily utilize. These include, but are not limited to, text, comma separate values (CSV), JavaScript Object Notation (JSON), Joint Photographic Experts Group (JPG) and Portable Network Graphics (PNG). These formats allow graphics and photographs to be intelligible to current AI models in addition to natural language text. As used herein and in the appended claims, the term "format compatible with an AI tool" or "AI tool compatible format" and similar terms will refer to a file or data format that is readily ingestible to an AI tool. What format or formats are readily ingestible to a particular AI model will vary depending on the configuration of that specific AI model. However, in general, formats that are used by applications from multiple developers, such as those examples listed above, e.g., CSV, JSON, text or rich text, JPG, PNG, etc., will be compatible with different AI models.

As shown in FIG. 1, the image generating AI tool 114 will return one or more images generated using the data from the two input image files 108 and 110 and the user's description. The AI tool may generate a number of alternative images from the same inputs from which the user can select. Because the inputs to the AI tool 114 include the data of the two input image files 108 and 110, the resulting image is more likely to feature a person and flower similar in appearance to the person and flower of the input images. This solves the technical problem of the AI tool 114 generating the appearance of a person, flower or other requested image element at random and allows the user some ability to customize the resulting output image in accordance with the inputs.

The service on the server 116 will then return the fused image or alternative images to the presentation application 106 as shown in FIG. 1. The user can then select among the alternatives, if offered, and place the image that was wanted into a presentation being prepared. Again, this solves the technical problem of the user wanting or needing a single image with specified content where the user previously did not possess that single image.

Figure 2:
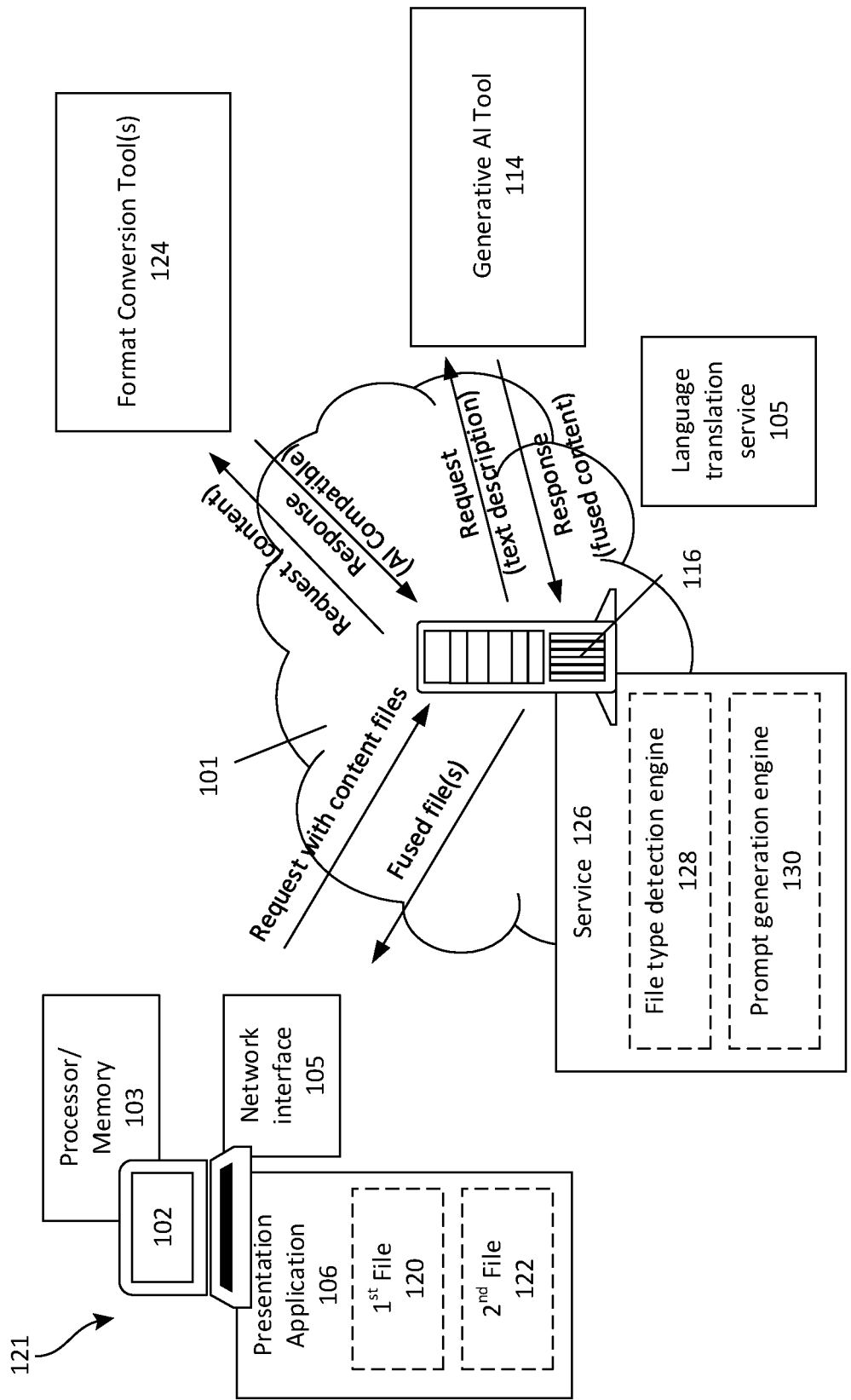
FIG. 2 depicts another example system upon which aspects of this disclosure may be implemented to generate new content of a variety of different types.

FIG. 2 depicts another example system upon which aspects of this disclosure may be implemented to generate new content of a variety of different types. In general, the example of FIG. 2 illustrates that the concepts disclosed here can be applied to a variety of different content types, not just the combination of the content of two images into a single fused image. This system 121 again includes a computer 102 with a processor and associated memory 103 that is executing a presentation application 106.

However, in this example, the media or content files 120 and 122 can be of any of a variety of types including, but not limited to, text, image, video, audio, and code. Any combination of these content types can be fused or combined into a single file or object for inclusion in a presentation being created with the presentation application 106. For example, an image file combined with an audio file could result in a video object that displays the image of the image file as a still while playing the audio of the audio file. The resulting video object can then be incorporated into a presentation. An image and video file could be combined into a video object in which the image is added, per user instructions, to the other imagery from the video file. AI tools and other services can generate content from different inputs as part of fusing content as described herein such as text to image (Dall-E/ Stable Diffusion); text to video, text to audio, text to code (GitHub), audio to text (Audio LM), audio to audio (Audio LM), image to text (generative pre-trained transformer or GPT) and video to text.

Consequently, as shown in FIG. 2, the presentation application 106 sends a request with two or more content files 120 and 122 to a service 126 on the server 116. The service 126 includes a file type detection engine 128. Using metadata, file extensions, codecs, user input or other means, the file type detection engine 128 determines what type of content is present in the content files 120 and 122, e.g., text, video, audio, images, etc. With this determination, as in FIG. 1, the service 126 will call one or more format conversion tools 124 in order to render the content of the files, if needed, into an AI tool compatible format. This may include calling a language translation service 105, as described above.

When the content data is all in an AI tool compatible format, the prompt generation engine 130 will, as described above, structure a prompt or request for the generative AI tool 115. This generative AI tool may be, for example, Dall-E, Stable Diffusion or other image or video generating AI tools or could be or include an AI text generating tool, such as some version of GPT. The generative AI tool will also receive the instructions from the user in the prompt from the prompt generation engine 130 and will fuse or combine the content of the media files 120 and 122 as instructed. The response with the fused content is returned to the service 126, which provides the fused content, including alternatives if any, to the presentation application 106 for the user to include in a presentation being prepared.

Figure 3:
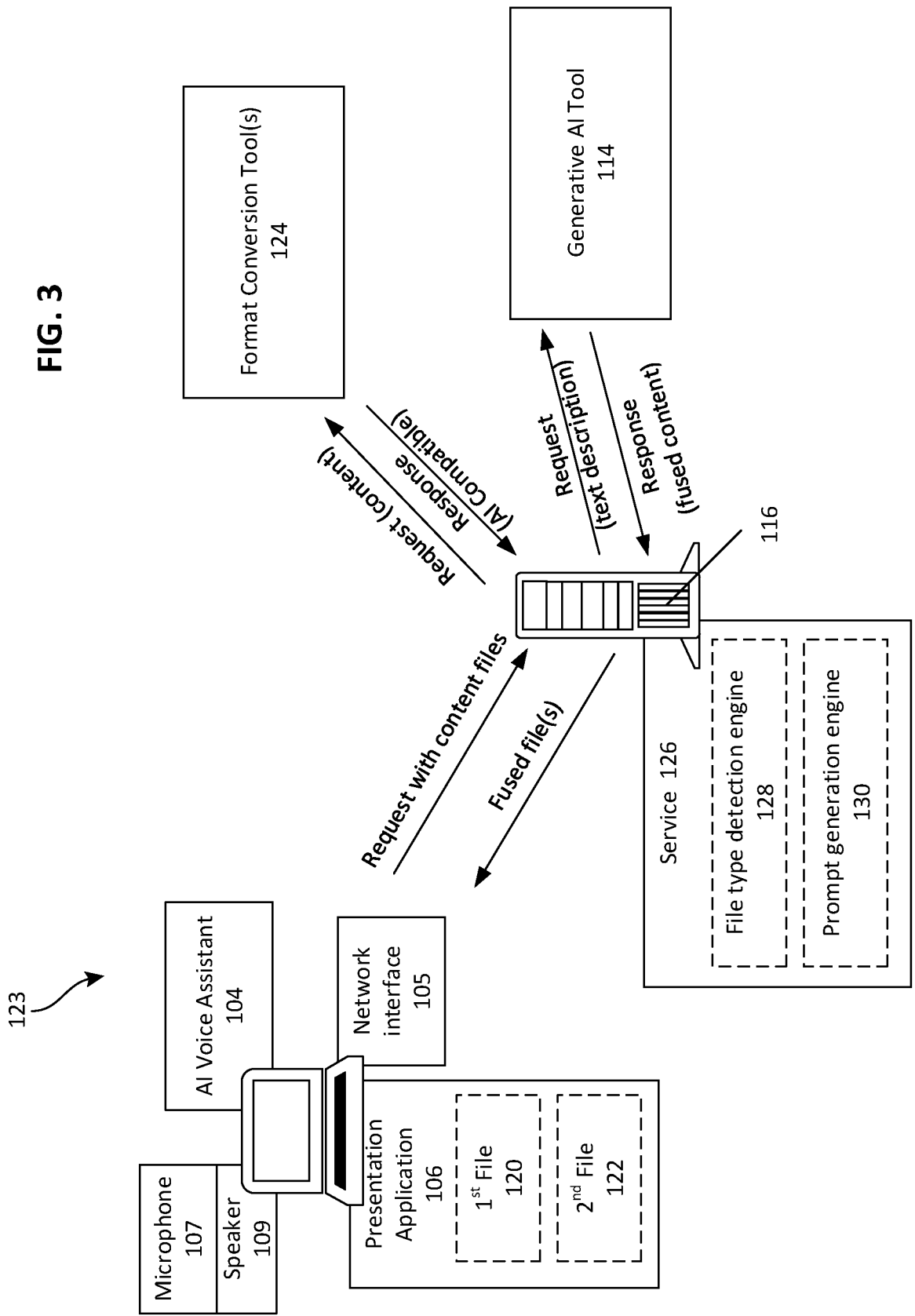
FIG. 3 depicts another example system upon which aspects of this disclosure may be implemented to generate new content of a variety of different types with a voice assistant.

FIG. 3 depicts another example system 123 upon which aspects of this disclosure may be implemented to generate new content of a variety of different types with a voice assistant. The example in FIG. 3 is similar to that of FIG. 2 except that in FIG. 3, the computer 102 includes an AI voice assistant.

AI voice assistants are computer programs that use artificial intelligence to process natural language commands and provide helpful responses to users. These assistants are designed to be hands-free and accessible, using voice recognition technology to understand and interpret spoken requests. Cortana® is one such example of an AI voice assistant, developed by Microsoft® for use on their Windows operating system. Other examples include Apple's Siri, Amazon's Alexa, and Google Assistant. These assistants are often integrated into computers, mobile devices, smart speakers, and other smart home devices, allowing users to control their technology and access information with just their voice. AI voice assistants use a variety of techniques to understand and respond to user requests, including natural language processing, machine learning, and speech recognition. They are able to perform a wide range of tasks.

In the example of FIG. 3, the computer 102 includes a microphone 107 to transduce commands spoken by a user and a speaker 109 to output audio (e.g., verbal) information to the user. These devices enable the AI voice assistant 104 to receive commands or make audio prompts to the user. For example, the user may utilize the AI voice assistant 104 to input a command to fuse to media files, such as "combine the two images on Slide 8 into an image of a person holding a flower." The AI voice assistant 104 then interacts with the presentation application 106 to initiate the fusion of the content of the two media files 120 and 122 as in the example of FIG. 2 above.

The AI voice assistant 104 can also make suggestions, such as "would you like Cortana to provide you with image suggestions for your slide?" or "would you like to combine the content of the two media objects on slide 8 into one media object?" Over time, the AI voice assistant will also learn the user's typical behavior and can make suggestions based on prior use patterns. For example, if the user typically has created a fused image from two prior images when preparing a presentation, but has not done so yet in creating a current presentation, the AI voice assistant 104 may prompt the user with an audible spoken output, such as "Would you like to upload any images to be fused or see suggestions for using images current in the presentation?" Overall, if the user uploads any audio/video/image or other media file, then the user is given suggestions to use feature of the presentation application (e.g., stock images or audio) to increase feature discoverability. Over time, the algorithm learns what the user's style is and improves suggestions in a designer or suggestion pane of the presentation application. For example, if the user always inserts an image with flowers or flower theme decks, the designer/suggestion pane will focus on suggestions that include flowers or a floral theme.

Figure 4A:
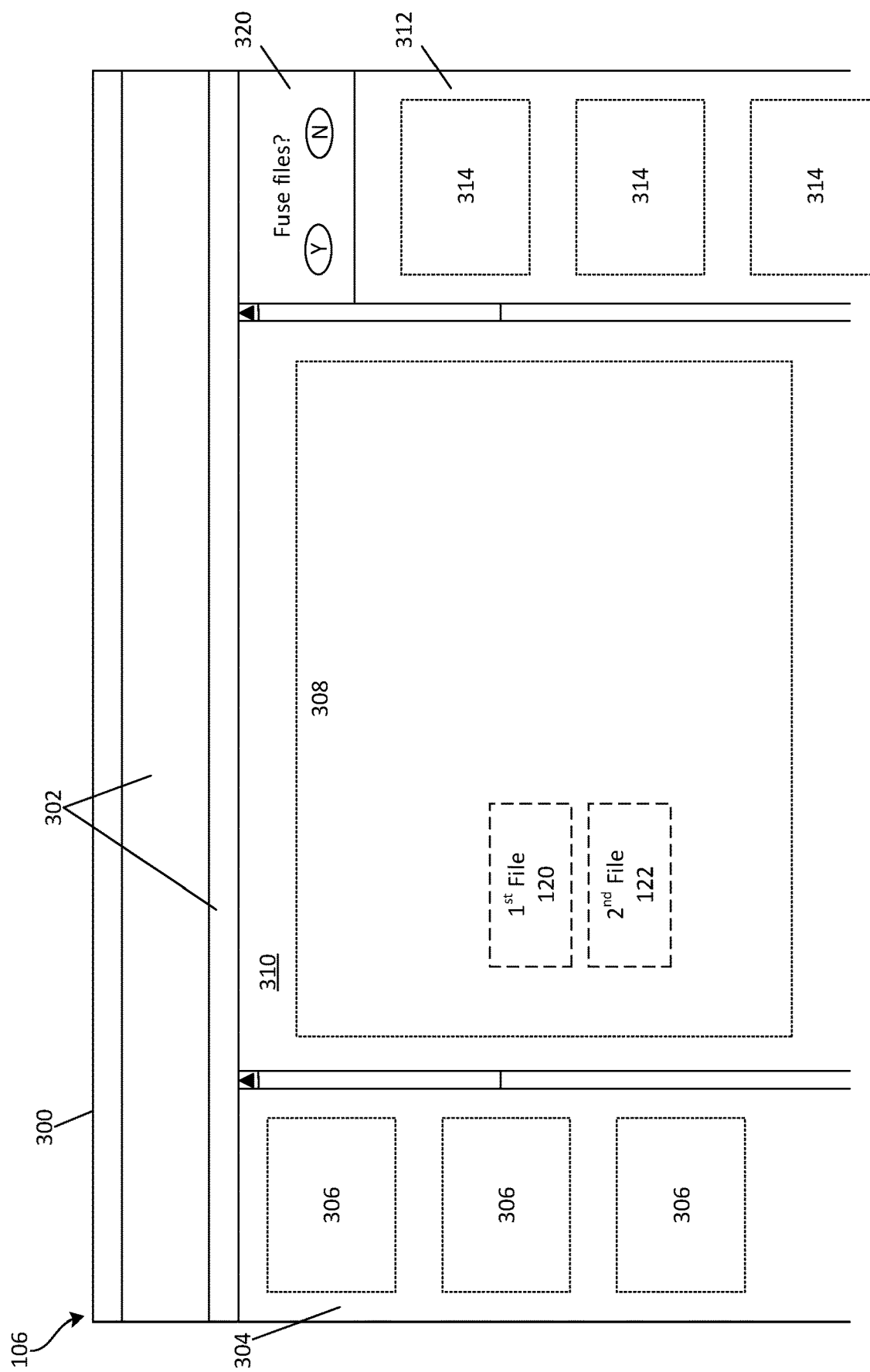
FIG. 4A depicts an example user interface for a system such as those of FIGS. 1-3.

FIG. 4A depicts an example user interface for a system such as those of FIGS. 1-3. As shown in FIG. 4A, the presentation application 106 can have an interface 300 with the following elements. Various status and toolbars 302 provide user controls at a top of the interface 300. In a central pane 310, a current focused slide 308 is depicted and may include various content elements, including the content of the first and second files 120, 122 discussed above. A left pane 304 may include smaller versions or thumbnails 306 of all the slides in the presentation in order. This allows the user to navigate to and focus on any of the slides in the presentation.

A right pane 312 may be a designer or suggestion pane with which the application 106 suggests alternative configurations or layouts 314 for the slide 308. By selecting any of these options 314, the user can reconfigure the focused slide 308. This pane 312 may also include user interface elements to invoke the content combination technique described above. For example, when the two files 120 and 122 are added to the slide 308, the application 106 may respond with a prompt 320 that asks the user whether to fuse the content of the two files, as described herein. The user may dismiss the prompt with a negative response. Alternatively, the user may affirmatively instruct the combination of the file content.

Figure 4B:
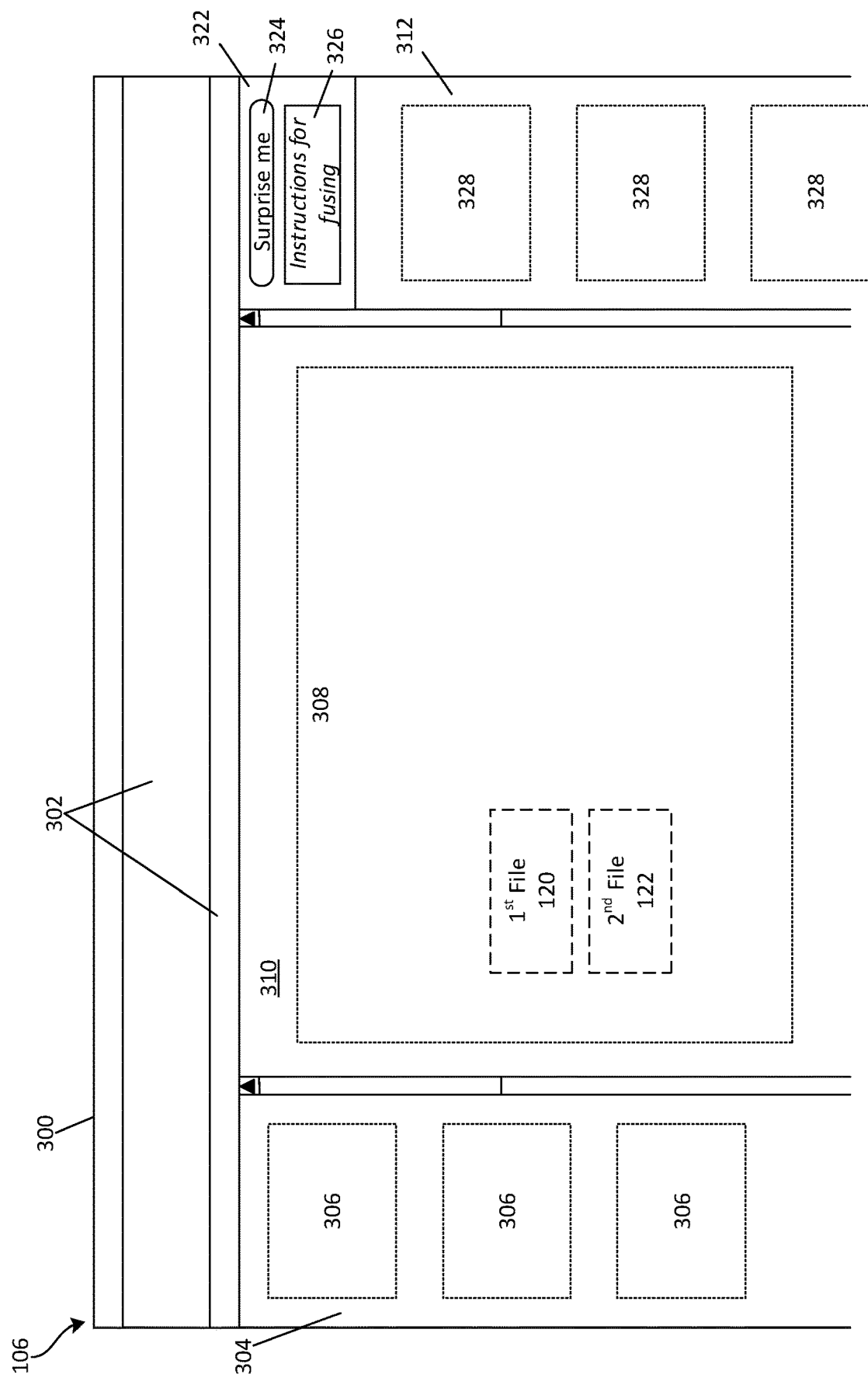
FIG. 4B depicts an example of the user interface of FIG. 4A at a subsequent stage.

FIG. 4B depicts an example the user interface of FIG. 4A at a subsequent stage. In FIG. 4B, the user has responded affirmatively that the content of the two files is to be fused. Accordingly, the prompt 320 is replaced with a new user interface element 322. This element 322 includes two options. First, the user can select a button 324 with an instruction such as "surprise me." Under this option, the system is instructed to combine or fuse the content of the two files without specific instructions as to how. Accordingly, the prompt generation image 130, discussed above, would submit the request to the generative AI tool 114 to combine the content into a single object without further instruction as to how. The generative AI tool 114 will then make its own determinations as to combining the content and may generate several different alternatives 328 that can be offered to the user in the right pane 312.

Alternatively, the user interface element 322 includes a field 326 that prompts the user to input instructions as to how to fuse or combine the content of the files 120, 122. In this case, the user would input an instruction, such as the example given above of "a person holding a flower" to specify the relationship between elements of the files 120, 122 to be used in the combined output. The field 326 will accept any instruction from the user as to how the content from the two files 120, 122 is to be combined in the fused output.

Figure 5:
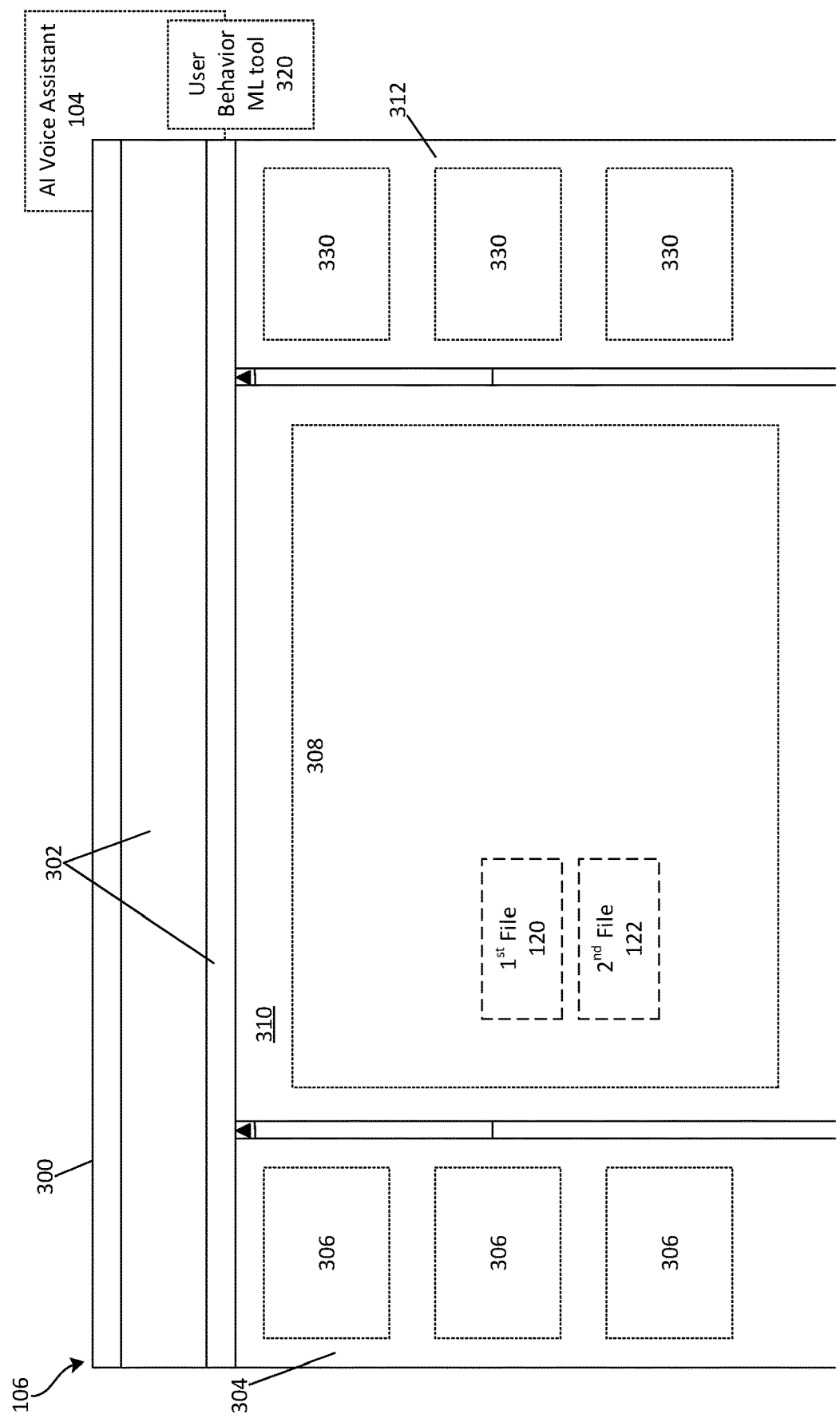
FIG. 5 depicts another example of a user interface for a system such as those of FIGS. 1-3.

FIG. 5 depicts another example user interface for a system such as those of FIGS. 1-3. In FIG. 5, the user interface 300 of the presentation application 106 includes interaction with the AI voice assistant 104 as described above. Specifically, this AI voice assistant 104 includes a user behavior machine learning (ML) tool 320. This tool 320 is trained using the behavior of the user in preparing presentations with the application 106. As in the examples noted previously, if the user typically requests the combination or fusion of content from multiple files in preparing a presentation, the ML tool 320 will learn this preference over time. Consequently, as noted above, the AI voice assistant 104 or other user interface of the application 106 may prompt the user for an instruction whether to fuse the content of multiple media files or objects of a slide or slides. The AI voice assistant 104 may annunciate the question using the speaker of the computer and take an input response using the microphone of the computer. In another example, if the user regularly uses a particular theme or element, such as flowers or a floral theme, the user behavior ML tool 320 will learn this behavior. Consequently, the user behavior ML tool 320 will include instructions for the prompt generation engine 130 to direct the generative AI tool 114 to prepare content using that preferred theme or using the recurring element, perhaps in addition to the content from two objects that is being fused. As a result, the suggested slides 330 in the right pane 312 will be influenced by the user behavior ML tool 320. In this way, the themes or elements preferred by the user, as demonstrated by user behavior over time, will be reflected in the suggestions 330 presented to the user.

Figure 6:
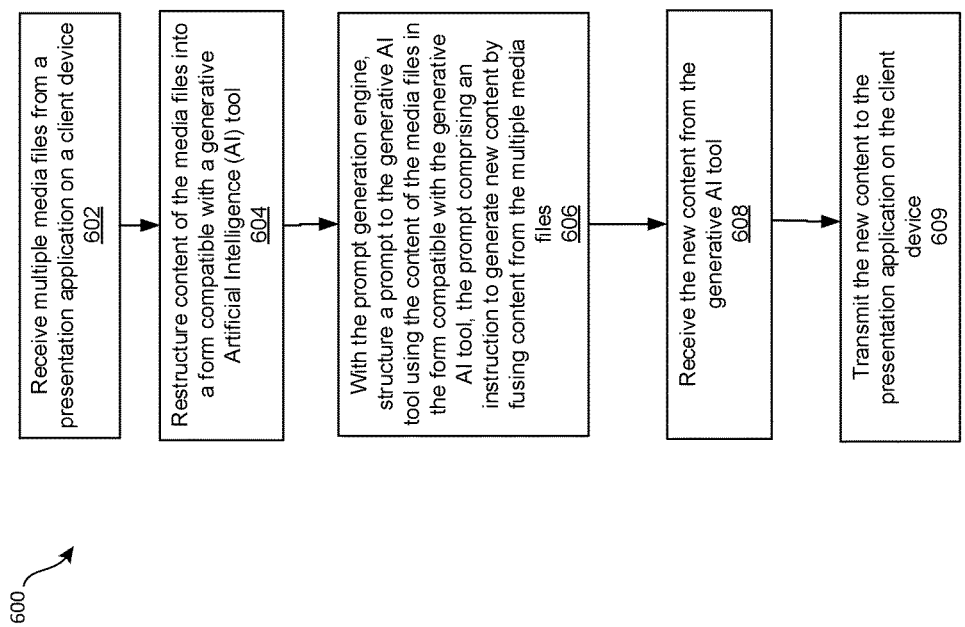
FIG. 6 depicts a flowchart of a method of implementing the new content generation of the present disclosure.

FIG. 6 depicts a flowchart of a method of implementing the new content generation of the present disclosure. This is an example method of operation for the server 116, which will include a processor, a network interface and a memory comprising programming instructions, including the prompt generation engine which, when executed by the processor alone or in combination with other processors, causes the server to implement a service to: receive 602 multiple media files from a presentation application on a client device; restructure 604 content of the media files into a form compatible with a generative Artificial Intelligence (AI) tool; with the prompt generation engine, structure 606 a prompt to the generative AI tool using the content of the media files in the form compatible with the generative AI tool, the prompt comprising an instruction to generate new content by fusing content from the multiple media files; receive 608 the new content from the generative AI tool; and transmit 609 the new content to the presentation application on the client device to augment a presentation being generated with the presentation application.

Figure 7:
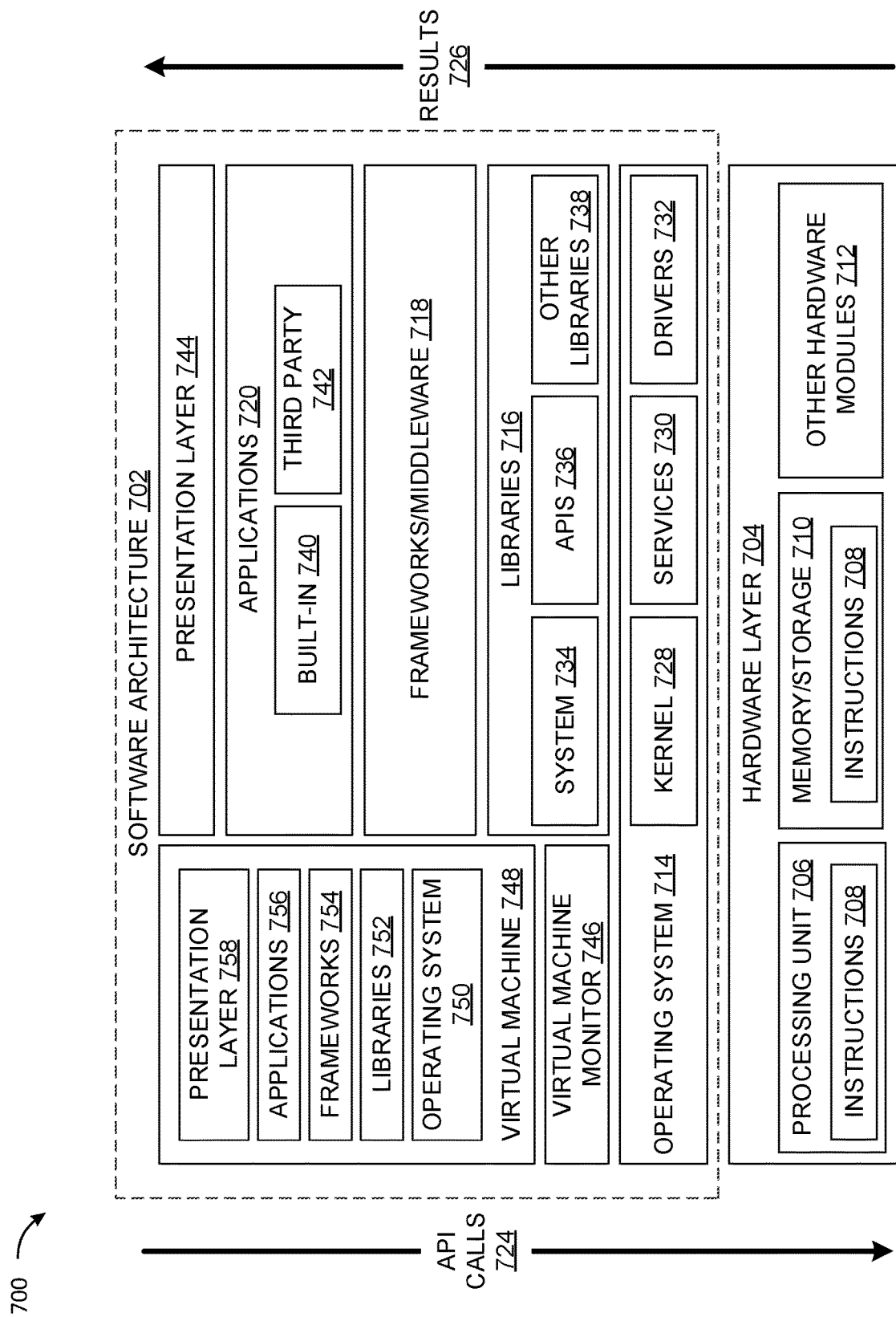
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. This software architecture may represent the software of the rollout service 301 or other component shown in FIG. 3B. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
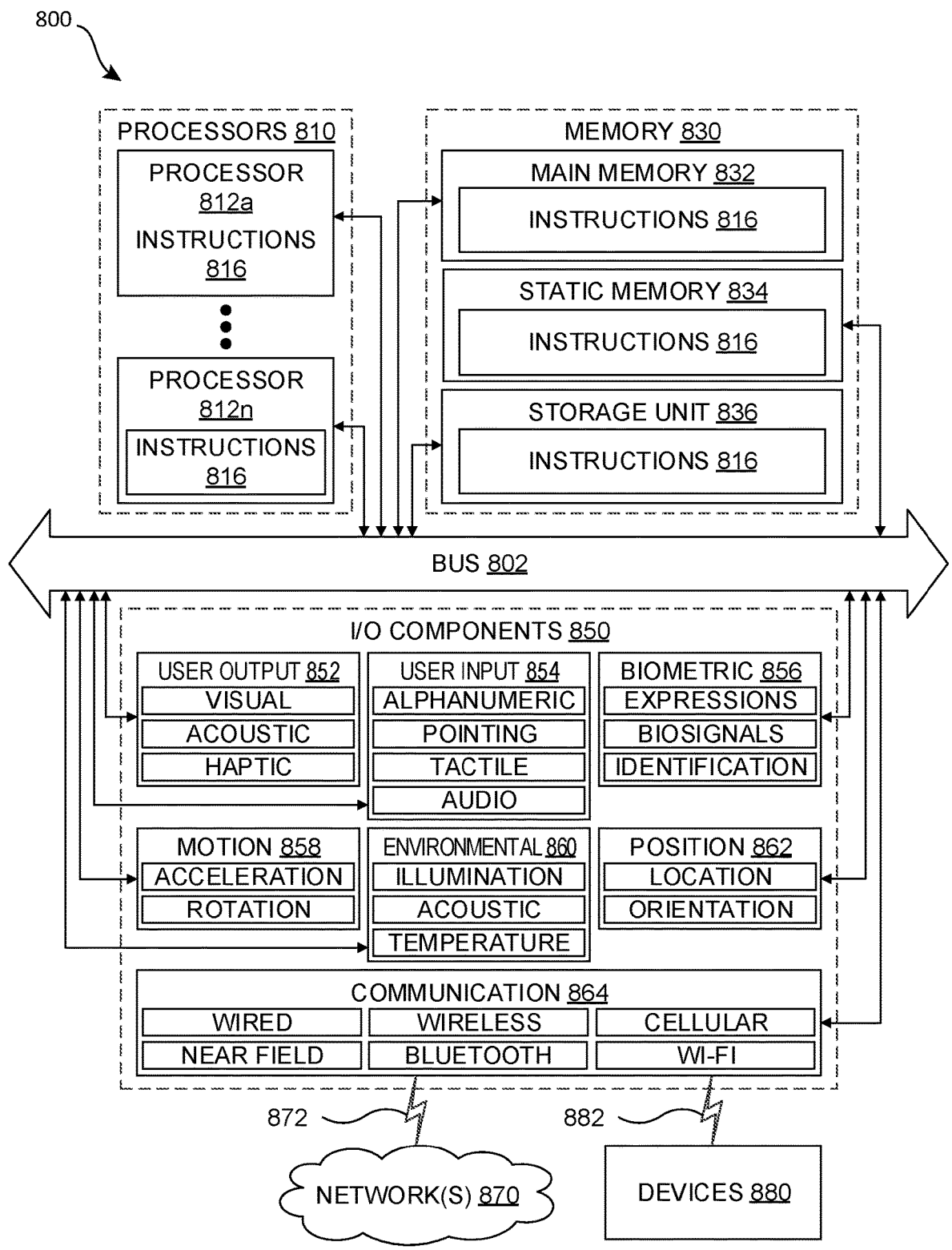
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. This example machine may represent the hardware of the rollout service 301 or other component shown in FIG. 3B.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a server having a processor and a network interface; and
  a memory comprising programming instructions including a prompt generation engine which, when executed by the processor alone or in combination with other processors, causes the server to implement a service to:
  receive multiple media files from a presentation application on a client device;
  restructure content of the media files into a form compatible with a generative Artificial Intelligence (AI) tool;
  with the prompt generation engine, structure a prompt to the generative AI tool using the content of the media files in the form compatible with the generative AI tool, the prompt comprising an instruction to generate new content by fusing content from the multiple media files;
  receive the new content from the generative AI tool; and
  transmit the new content to the presentation application on the client device to augment a presentation being generated with the presentation application.

Item 2. The data processing system of Item 1, wherein the service further comprises a file detection engine to determine a type of media in each of the multiple media files and identify one or more corresponding format conversion tools that are called to restructure the content of the medial files into the form compatible with the generative AI tool.

Item 3. The data processing system of Item 1, wherein the prompt generation engine further comprises a call function to a language translation service to translate the content of the multiple media files into English.

Item 4. The data processing system of Item 1, wherein the multiple media files are accompanied by a user instruction as to how the content of the multiple media files is to be combined when fusing the content, the prompt generation engine to structure the prompt for the generative AI tool to include a corresponding instruction as to how the content of the multiple media files is to be combined when the generative AI tool is fusing the content.

Item 5. The data processing system of Item 1, wherein the presentation application is integrated with an AI voice assistant, the AI voice assistant configured to receive spoken user input regarding fusing the content of the multiple media files.

Item 6. The data processing system of Item 1, wherein the service uses the generative AI tool to generate multiple alternative versions of the new content and provides the alternative versions to the presentation application.

Item 7. A presentation application for execution by a client device comprising a processor and memory, the presentation application to be stored in non-transitory memory of the client device and comprising executable instructions that, when executed by the processor causes the processor alone or in combination with other processors to:
  present a user interface for generating a presentation, the user interface configured to receive multiple media files each comprising content to be included in the presentation; and
  in response to user instructions, call a service to
  restructure content of the media files into a form compatible with a generative Artificial Intelligence (AI) tool;
  structure a prompt to the generative AI tool using the content of the media files in the form compatible with the generative AI tool, the prompt comprising an instruction to generate new content by fusing content from the multiple media files; and
  transmit the new content to the presentation application on the client device; the application to display the new content in the user interface with controls for using the new content to augment the presentation being generated with the presentation application.

Item 8. The presentation application of Item 7, the user interface further comprising an element asking a user whether to fuse the content of received media files.

Item 9. The presentation application of Item 8, wherein the element is displayed in response to the application receiving the multiple media files.

Item 10. The presentation application of Item 8, wherein the element comprises a field for accepting user instruction as to how the content of the multiple media files is to be combined by the generative AI tool.

Item 11. The presentation application of Item 8, wherein the element comprises a user control to call the service without user instruction as to how the content of the multiple media files is to be combined by the generative AI tool.

Item 12. The presentation application of Item 7, the user interface further comprising a pane in which design suggestions for a slide of the presentation are displayed.

Item 13. The presentation application of Item 12, wherein the service returns multiple different versions of the new content, and the presentation application displays the multiple different versions of the new content in the design suggestion pane with user controls for selecting which of the different versions to include in the presentation.

Item 14. The presentation application of Item 7, wherein the application comprises an interface to communicate with an Artificial Intelligence (AI) voice assistant.

Item 15. The presentation application of Item 14, wherein the application is structured to receive transduced user input instructing the application when or how to fuse the content of the multiple media files using the service.

Item 16. The presentation application of Item 14, wherein the application is structured to output audible prompts to the user for fusing the content of the multiple media files with the AI voice assistant.

Item 17. The presentation application of Item 14, wherein the application includes access to a user behavior machine learning tool to learn user behavior regarding fusing the content of multiple media files, the application to output suggestions based on the learned user behavior.

Item 18. A method of providing a service to generate new content by combining two input sets of content, the service supported by a server having a processor, a network interface and
- a memory comprising programming instructions including a prompt generation engine which, when executed by the processor alone or in combination with other processors, causes the server to implement the method, the method comprising:
- receiving multiple media files from a presentation application on a client device;
- restructuring content of the media files into a form compatible with a generative Artificial Intelligence (AI) tool;
- with the prompt generation engine, structuring a prompt to the generative AI tool using the content of the media files in the form compatible with the generative AI tool, the prompt comprising an instruction to generate new content by fusing content from the multiple media files;
- receiving the new content from the generative AI tool; and
- transmitting the new content to the presentation application on the client device to augment a presentation being generated with the presentation application.

Item 19. The method of Item 18, wherein the multiple media files are accompanied by a user instruction as to how the content of the multiple media files is to be combined when fusing the content, the method further comprising structuring the prompt for the generative AI tool to include a corresponding instruction as to how the content of the multiple media files is to be combined when the generative AI tool is fusing the content.

Item 20. The method of Item 18, wherein the presentation application is integrated with an AI voice assistant, the method further comprising receiving spoken user input regarding fusing the content of the multiple media files.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a server having a processor and a network interface; and
a memory comprising programming instructions including a prompt generation engine which, when executed by the processor alone or in combination with other processors, causes the server to implement a service to:
receive multiple media files from a presentation application on a client device, the presentation application including a user interface for enabling a user to organize content, including content from different content files, to form a presentation to be displayed, the multiple media files being selectable by the user with the user interface of the presentation application;
restructure content of the media files into a form compatible with a generative Artificial Intelligence (AI) tool;
with the prompt generation engine, structure a prompt to the generative AI tool using the content of the media files in the form compatible with the generative AI tool, the prompt comprising an instruction to generate new content by fusing content from the multiple media files, wherein fusing content includes combining content from two or more of the media files to produce the new content as a combination of content from two or more of the media files;
receive the new content from the generative AI tool; and
transmit the new content to the user interface of the presentation application on the client device, the user interface having tools to utilize the new content to augment the presentation being generated with the presentation application.

2. The data processing system of claim 1, wherein the service further comprises a file detection engine to determine a type of media in each of the multiple media files and identify one or more corresponding format conversion tools that are called to restructure the content of the media files into the form compatible with the generative AI tool.

3. The data processing system of claim 1, wherein the prompt generation engine further comprises a call function to a language translation service to translate the content of the multiple media files into English.

4. The data processing system of claim 1, wherein the multiple media files are accompanied by a user instruction as to how the content of the multiple media files is to be combined when fusing the content, the prompt generation engine to structure the prompt for the generative AI tool to include a corresponding instruction as to how the content of the multiple media files is to be combined when the generative AI tool is fusing the content.

5. The data processing system of claim 1, wherein the presentation application is integrated with an AI voice assistant, the AI voice assistant configured to receive spoken user input regarding fusing the content of the multiple media files.

6. The data processing system of claim 1, wherein the service uses the generative AI tool to generate multiple alternative versions of the new content and provides the alternative versions to the presentation application.

7. A presentation application for execution by a client device comprising a processor and memory, the presentation application to be stored in non-transitory memory of the client device and comprising executable instructions that, when executed by the processor causes the processor alone or in combination with other processors to:
display a user interface for the presentation application;
receive at the user interface a plurality of media files selected by a user;
receive at the user interface a user instruction to fuse the plurality of media files according to a specified relationship between elements of the plurality of media files to generate a presentation for display on the user interface;
in response to the user instruction;
restructure content of the media files into a form compatible with a generative Artificial Intelligence (AI) tool;
structure a prompt to the generative AI tool using the content of the media files in the form compatible with the generative AI tool, the prompt comprising the user instruction to generate new content by fusing the content from the plurality of media files according to the specified relationship between the elements of the plurality of media files, the new content including a plurality of alternative versions;
display the new content to the presentation application on the client device; and
receive at the user interface a user selection among the alternative versions of the new content.

8. The presentation application of claim 7, the user interface further comprising an element asking a user whether to fuse the content of received media files.

9. The presentation application of claim 8, wherein the element is displayed in response to the application receiving the plurality of media files.

10. The presentation application of claim 8, wherein the element comprises a field for accepting user instruction as to how the content of the plurality of media files is to be combined by the generative AI tool.

11. The presentation application of claim 8, wherein the element comprises a user control to call the service without user instruction as to how the content of the plurality of media files is to be combined by the generative AI tool.

12. The presentation application of claim 7, the user interface further comprising a pane in which design suggestions for a slide of the presentation are displayed.

13. The presentation application of claim 12, wherein the service returns multiple different versions of the new content, and the presentation application displays the multiple different versions of the new content in the design suggestion pane with user controls for selecting which of the different versions to include in the presentation.

14. The presentation application of claim 7, wherein the application comprises an interface to communicate with an AI voice assistant.

15. The presentation application of claim 14, wherein the application is structured to receive transduced user input instructing the application when or how to fuse the content of the plurality of media files using the service.

16. The presentation application of claim 14, wherein the application is structured to output audible prompts to the user for fusing the content of the plurality of media files with the AI voice assistant.

17. The presentation application of claim 14, wherein the application includes access to a user behavior machine learning tool to learn user behavior regarding fusing the content of multiple media files, the application to output suggestions based on the learned user behavior.

18. A method of providing a service to generate new content by combining two input sets of content, the service supported by a server having a processor, a network interface and a memory comprising programming instructions including a prompt generation engine which, when executed by the processor alone or in combination with other processors, causes the server to implement the method, the method comprising:

receiving multiple media files from a presentation application on a client device, the presentation application including a user interface for enabling a user to organize content, including content from different content files, to form a presentation to be displayed, the multiple media files being selectable by the user with the user interface of the presentation application;

restructuring content of the media files into a form compatible with a generative Artificial Intelligence (AI) tool;

with the prompt generation engine, structuring a prompt to the generative AI tool using the content of the media files in the form compatible with the generative AI tool, the prompt comprising an instruction to generate new content by fusing content from the multiple media files, wherein fusing content includes combining content from two or more of the media files to produce the new content as a combination of content from two or more of the media files;

receiving the new content from the generative AI tool; and transmit the new content to the user interface of the presentation application on the client device, the user interface having tools to utilize the new content to augment the presentation being generated with the presentation application.

19. The method of claim 18, wherein the multiple media files are accompanied by a user instruction as to how the content of the multiple media files is to be combined when fusing the content, the method further comprising structuring the prompt for the generative AI tool to include a corresponding instruction as to how the content of the multiple media files is to be combined when the generative AI tool is fusing the content.

20. The method of claim 18, wherein the presentation application is integrated with an AI voice assistant, the method further comprising receiving spoken user input regarding fusing the content of the multiple media files.

* * * * *